May 11, 1937.  B. D. WOOLLEY  2,079,999
MOTOR VEHICLE TRANSMISSION
Filed Sept. 16, 1935
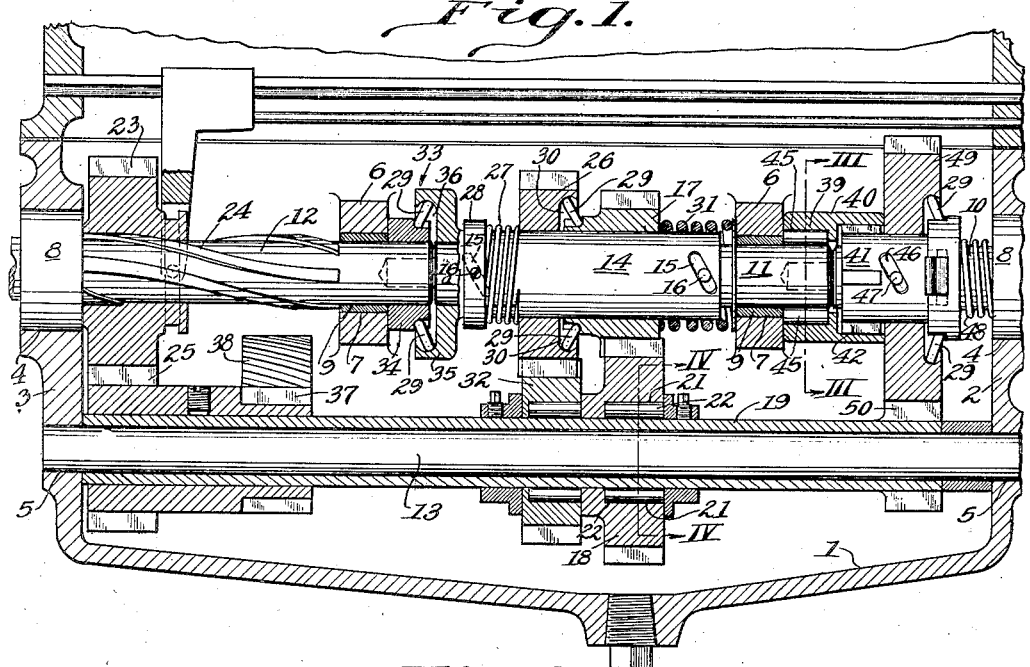
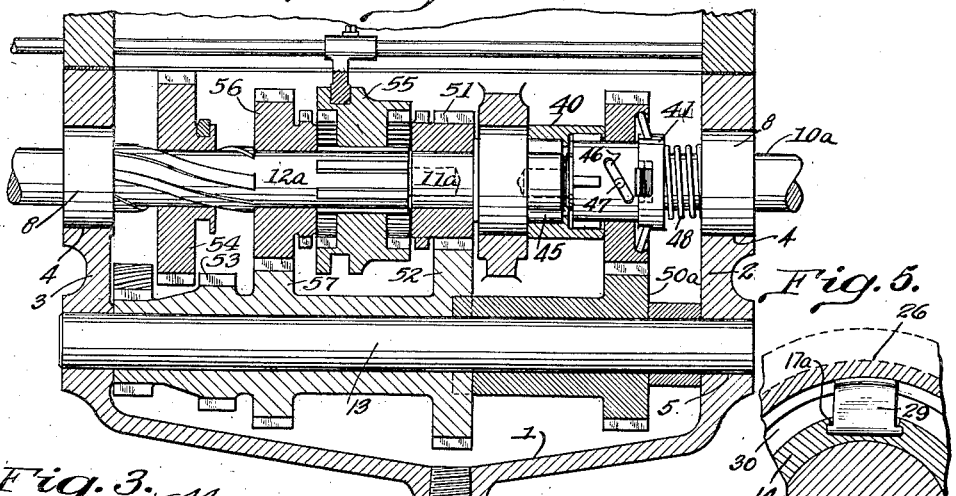
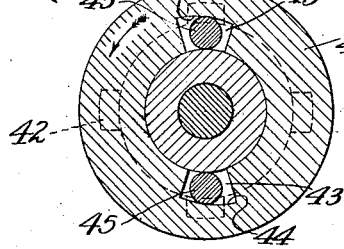
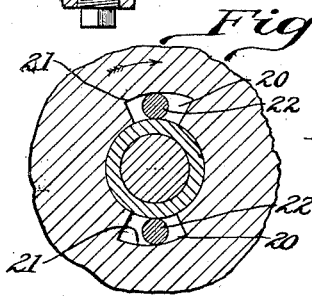
Inventor
Bruce D. Woolley
Attorney Patented May 11, 1937

2,079,999

UNITED STATES PATENT OFFICE 2,079,999

MOTOR VEHICLE TRANSMISSION

Bruce D. Woolley, Johnstown, Ohio

Application September 16, 1935, Serial No. 40,663

5 Claims. (Cl. 74—337)

This invention relates to motor vehicle power transmissions and is particularly directed to that type of transmission in which the driving ratio changes automatically in accordance with the demands placed upon the vehicle to which it is applied.

The transmission forming the subject matter of the present invention is quite similar in operating principles to the transmission shown in my co-pending application, Serial No. 25,286 of which this application is a continuation-in-part.

The primary object of this invention is the provision of a selective gear transmission which will utilize the resistance offered by the weight of the vehicle to be moved together with the friction developed to change the driving ratio to deliver more or less power as occasion demands.

It is also an object of the invention to employ one or more sleeves movable longitudinally of certain shafts to cause the engagement and disengagement of clutches for connecting the driving gears to the shafts, or the shafts to one another.

It is a further object of the invention to provide driving means between the shafts and gears which will permit relative movement therebetween so that the gears may be maintained constantly in mesh to avoid clash and other disagreeable noise.

A still further object of the present invention resides in the provision of an automatically actuated over-drive gearing which may be employed in the automatic transmission shown or may be applied to the manually operated transmissions forming a part of the regular equipment of standard cars now being produced.

Further objects will be apparent from the following description taken in connection with the drawing forming a part of this specification and in which is shown the preferred embodiment of the present invention.

In the drawing:

Fig. 1 is a vertical longitudinal sectional view taken through a transmission constructed in accordance with the present invention;

Fig. 2 is a similar view illustrating a manually operated transmission, employed on present standard makes of cars, equipped with the automatic over-drive gearing which forms a part of the transmission shown in Fig. 1;

Fig. 3 is a transverse sectional view through one of the coupling sleeves or clutches employed, the plane of the section being indicated by the line III—III of Fig. 1;

Fig. 4 is also a transverse section taken through a flexible driving member arranged between certain of the gears and their cooperating shafts, the plane of this section being indicated by the line IV—IV of Fig. 1.

Fig. 5 is a detail transverse sectional view through a clutch used in the transmission.

Referring more particularly to the drawing, the numeral 1 designates the transmission housing which may be formed from cast iron in the usual manner. The front and rear walls 2 and 3 of the housing are provided with upper and lower sets of longitudinally aligned openings 4 and 5. Intermediate of the length of the housing, a pair of transverse webs 6 are provided and these are also formed with openings 7 aligned with the upper set of openings 4. The upper set of openings 4 receive anti-friction bearings 8 and the openings 7 in the webs 6 receive sleeve bearings 9 for the rotatable reception of shaft sections 10, 11 and 12. The shaft section 10 is connected at its forward end with the driven member of the automobile clutch (not shown) while the section 12 leads to the drive shaft (not shown) of the vehicle. The lower set of openings receive the counter shaft 13 which provides an axle for the rotatable support of idler gears employed in the transmission.

The shaft section 11 is provided with a sleeve 14 in the side wall of which is formed a plurality of angular slots 15. Pins 16 and 16a rigidly carried by the shaft section project into the slots 15 and lock the sleeve 14 thereto but permit of a limited amount of rotative and longitudinal movement therebetween. A gear member 17 is rigidly secured to the sleeve 14 and moves therewith.

The gear 17 meshes with an idler gear 18 carried by a sleeve 19 on the counter shaft 13. Internally the idler gear 18 is provided with a plurality of chambers 20 which include cam surfaces 21. Each of the chambers 20 receives a hardened steel roller 22 which forms the connecting element between the idler gear and the sleeve. This type of connection will permit the gear to rotate the shaft or sleeve in a forward direction but will not permit the sleeve to rotate the gear in this direction. A connection of this type is commonly termed an over-running clutch.

The shaft section 12 is provided with a gear member 23 arranged to rotate therewith through the use of splines 24 which permit the gear 23 to be moved longitudinally of the shaft to engage or disengage a complemental gear 25 also carried by the sleeve 19. When the gears 23 and 25 are in engagement, rotation of the shaft section 11 will be transmitted to the shaft section 12 through the gears 17, 18, 23 and 25 but the latter shaft will rotate at a much slower speed than the former.

To rotate the shaft section 12 at a faster rate but still at a speed less than that of section 11, the sleeve 14 rotatably carries a gear member 26 of a size larger than the member 17. A coil spring 27, arranged between the gear 26 and a collar 28 rigidly secured to the shaft 11 by the pin 16a, exerts a pressure on the gear 26 to move it toward the gear 17. The latter gear carries a plurality of clutch dogs 29 which fit into an annular recess 30 formed in the side of the gear 26. As shown in Fig. 5, the lower ends of the dogs 29 are positioned for rocking movement within recesses 17a provided in the hub of the member 17. The side walls of the recesses force the dogs 29 to rotate with the member 17 and when the gears 17 and 26 are moved toward one another, the dogs 29 become wedged between the inner surface of the annular recess 30 and the bottom of the recesses 17a uniting the two members for rotation together. A heavy coil spring 31 arranged between the gear 17 and one of the ribs 6 moves the gear 17 toward the gear 26 to cause the clutch dogs to establish a driving connection between the sleeve 14 and the gear 26. An idler gear 32, also provided with an over-running clutch as is the gear 18, meshes with the gear 26 and transmits power therefrom to the sleeve 19, the gears 25 and 23 and the shaft 12. As the gears 26 and 32 differ in size from the gears 17 and 18 with the gear 26 larger than the gear 17, the shaft section 12 will rotate faster than in the set-up previously described.

To provide for the same speed of rotation in the shafts 11 and 12, they are coupled together by the clutch member 33. This clutch includes a hub 34 rigidly carried by the shaft 12, a plurality of clutch dogs 29 and a head 35 formed on the sleeve 14 and in the end of which is formed an annular recess 36. The recess 36 and the recess 30 in gear 26 may be provided with a clutch lining, if necessary, to make the driving engagement more positive. The heavy coil spring 31 moves the sleeve together with the gears 17 and 26 and the head 35 toward the hub 34 causing the dogs 29 to be wedged between the hub 34 and head 35 to form a driving connection. The engagement of this clutch takes place after the gear 26 has been connected with the sleeve 14 by its clutch, continued movement of the sleeve being possible because of the provision of the coil spring 27. The spring 27 offers sufficient resistance to the longitudinal movement of the gear 26 to permit the clutch dogs to connect it with the gear 17 but will permit them both to move a limited distance after their connection. This limited amount of movement is enough to cause the actuation of the clutch 33. When the clutch 33 is in operation, the shafts 11 and 12 rotate as one establishing a direct drive from the shaft 11 to the rear wheels. When this direct drive is established, the over-running clutches arranged between the gears 18 and 32 and the sleeve 19 permit these three elements to rotate at different speeds.

The hub of the gear 25 is provided with a gear 37 arranged to mesh with a second gear 38 carried on a stub shaft mounted to one side of the shaft 13. The gear 23 when moved forward to the extreme end of its travel will mesh with the gear 38 and the shaft 12 will rotate in a reverse direction when the shaft 11 is rotated.

Ordinarily, the shaft sections 10 and 11 rotate in unison because of the over-running clutch 39 which connects them together. The clutch 39 includes a thimble 40 connected to a sleeve 41, provided on the shaft 10, by a plurality of splines 42 which establish a positive rotating drive but permit relative longitudinal movement therebetween. The thimble 40 is formed with internal chambers 43 having cam surfaces 44 and containing rollers 45 which are gripped between the cam surfaces and the shaft 11 to establish a driving connection therebetween. When the thimble is rotated by the shaft 10, the shaft 11 will rotate therewith because of the clutch. However, the shaft 11 may rotate at a greater speed than the shaft 10 without rotating the thimble 40.

The sleeve 41, similar to the sleeve 14, is formed with an angular slot 46 which receives a pin 47 carried by the shaft 10. A spring 48 between the end of the sleeve 41 and the bearing 8 forces the sleeve toward the thimble 40. Loosely carried by the sleeve is a large gear 49 which meshes with a pinion 50 formed on the sleeve 19.

Arranged between the gear 49 and a hub provided on the sleeve 41 is a plurality of clutch dogs 29 which, when the sleeve is moved in response to the force of the spring 48, connects them together and causes them to rotate as one. When this occurs, the gear 49 will rotate the pinion 50 which, being a part of the sleeve 19, will cause the gear 25 to rotate and in turn rotate the gear 23 and the shaft 12 at a greater rate of speed than the shaft 10. This arrangement may be termed an over-drive because the shaft being driven rotates faster than the shaft doing the driving.

In the operation of the device, when the transmission is at rest, all of the clutches are in engagement in response to the forces of the springs 27, 31 and 48. When power is applied to shaft 10, the gear 49 tends to rotate the pinion 50 to drive the vehicle but the resistance developed by friction and the dead load holds the gear 49 stationary. The pin 47 turns with the shaft and due to the angularity of the slot 46, the sleeve 41 is drawn against the action of the spring 48 de-clutching the gear 49 from the sleeve.

The connection between the shafts 10 and 11 causes the shaft 11 to rotate and the sleeve 14 tends to rotate therewith but, due to the resistance offered by the shaft 12 through the clutch 33, is held stationary and pins 16 and 16a working in slots 15 move the sleeve against spring 31, de-clutching shaft 12 from shaft 11. Continued movement of shaft 11 causes sleeve 14 to move against spring 31 still more disengaging gear 26 from the sleeve 14. As shaft 11 continues to rotate, sleeve 14 must rotate for as the pins 16 and 16a reach the ends of the slots and since gear 17 is rigidly carried by the sleeve, it will rotate positively therewith, transmitting power to the driving wheels of the vehicle. When the mechanism is in this position, the transmission is said to be in first or low gear and maximum power is transmitted.

As the vehicle gets into motion and the requirement for power lessens, spring 31 will exert itself and move the sleeve sufficiently to cause gear 26 to be engaged and the speed of the vehicle increased. The transmission is then said to be in second gear. The additional speed further lessens the requirement for power and the spring 31 will move the sleeve still more until the clutch 33 engages and establishes a direct drive and the transmission is then in third or high gear.

When the vehicle is moving rapidly, the requirement for power is not as great because the momentum helps to overcome resistance developed by friction. The spring 48 then moves sleeve 41 causing gear 49 to be connected by its clutches to the sleeve. This establishes the overdrive which will operate only when the vehicle is moving at a high rate of speed and the power requirement is at a minimum. The spring 48 is made considerably weaker than the spring 31 so that the over-drive gear will only engage with the sleeve when the vehicle has attained a high speed and will be the first to be cut out when the speed is decreased.

In the form shown in Fig. 2, the over-drive mechanism employed in the automatic transmission is installed in a standard manually shiftable transmission. This form includes the longitudinally aligned shaft sections 10a, 11a and 12a which correspond to the sections 10, 11 and 12 in the automatic transmission. The shaft 10a carries a spring pressed sleeve 41 and a thimble 40 splined thereto as in the preferred form. Between the thimble 40 and the forward end of the shaft section 11a is arranged an over-running clutch, similar to clutch 39, which will permit the shaft section 11a to rotate at higher speed than the section 10a but will not permit it to rotate at a slower speed. When the over-drive is not operating, the power is transmitted from shaft 10a to shaft 11a and the standard transmission.

The standard transmission depicted includes the aligned shaft sections 11a and 12a. The section 11a has rigidly secured thereto a gear 51 with clutch teeth adjacent one end. The section 12a is provided with spiral keys on which is splined a gear 54. This gear is manually shiftable longitudinally of the shaft section on which it is mounted. A second gear 56 is rotatably mounted on the shaft section 12a in advance of the gear 54. The gear 56 is also formed with clutch teeth adjacent one end as is the gear 51. Slidably keyed to the shaft 12a between the gears 51 and 56 is a clutch member 55 provided at each end with internal clutch teeth adapted to receive the clutch teeth on the gears 51 and 56. The clutch member 55 is also manually shiftable to lock either the gear 51 or 56 to the shaft 12a.

Below the shaft sections 11a and 12a, the transmission is provided with a counter shaft on which is rotatably supported a sleeve formed with a plurality of various sized gears. The largest gear 52 is arranged to constantly mesh with the gear 51 carried by the shaft section 11a. The next size gear 57 is positioned in mesh with the gear 56 which is rotatable on the section 12a. The next smaller gear 53 is arranged to be engaged by the gear 54 when the latter is moved to its foremost position on the shaft 12a. When these two gears are in engagement, power is transmitted from shaft 11a through gears 51, 52, 53 and 54 to shaft 12a. Due to the particular size of the gears, this driving ratio is low.

When the gear 54 is moved rearwardly to a position between the gear 53 and an idler mounted to one side of the counter shaft, the driving connection between the shafts 11a and 12a is broken and the transmission is in neutral. When the clutch member 55 is moved to couple the gear 56 to the shaft 12a, power is then transmitted through gears 51, 52, 57 and 56 and the driving ratio is slightly raised.

To further increase the driving ratio, the clutch member 55 is moved forward to couple gear 51 to shaft 12a at which time this latter shaft and the section 11a will rotate in unison and a direct drive from engine to drive shaft is established.

Arranged about the countershaft in advance of the gear equipped sleeve is a second sleeve which is keyed to the first sleeve and has a gear 55a formed therewith. The gear 58a meshes with another gear 49a rotatably carried by the sleeve 41. A clutch of the type used to couple the gears to their sleeves in the preferred form of the invention is employed to unite the gear 49a with the sleeve 41.

When the vehicle reaches a speed previously determined, the power requirement is lessened sufficiently to permit the spring 48 to overcome the end thrust of the sleeve 41 generated by the resistance between the gears 49a and 58a. This will cause the gear 49 to be clutched to the sleeve and power will then pass through gear 49, pinion 50a, gears 52 and 51 to shaft 12a. Shaft 11a will then rotate with gear 51 at a greater rate of speed than shaft 10a; this difference in rate of rotation being made possible by the employment of the over-running clutch between the thimble and shaft 11a.

When the automatic transmission forming the subject of the present invention is employed, it will be necessary to provide means in connection with the vehicle clutch to hold it disengaged when it is desired to leave the car with the engine running.

While I have shown and described what I believe to be the preferred form of my invention, nevertheless, I wish it to be understood that numerous changes may be made in the construction of the various parts of the transmission without departing from the spirit and scope of the invention as has been set forth in the following claims.

What is claimed is:

1. A power transmission comprising a plurality of longitudinally aligned shafts, a counter shaft extending parallel to said shafts and spaced therefrom, a spring pressed sleeve carried by one of said shafts, a pin carried by the shaft supporting said sleeve, said pin extending into an angular slot formed in said sleeve whereby relative rotative movement between said sleeve and shaft will cause limited longitudinal movement therebetween, gear members carried by said sleeve and shafts, clutch means coupling one of said gears for rotation with the sleeve supporting it, said clutch being actuated by longitudinal movement of said sleeve in response to spring pressure, and complemental gears carried by said counter shaft in meshing relationship with the gear members carried by said sleeve and shafts.

2. A power transmission comprising a pair of longitudinally aligned shafts, a spring pressed sleeve member carried by one of said shafts, said sleeve member being movable a limited distance both longitudinally and rotatively with respect to said shaft, cam means between said sleeve and its shaft for moving the former against the action of the spring, clutch means between said sleeve and the second shaft, said clutch being active when said sleeve moves in response to said spring, a gear member rotatively carried by said sleeve, clutch means actuated by movement of said sleeve in response to pressure by said spring for securing said gear to said sleeve, said second clutch being operated slightly in advance of said first clutch, means for yieldably holding said gear against longitudinal movement by said spring, a counter shaft extending parallel to said first mentioned shafts and laterally spaced therefrom, a gear carried by said second shaft, and gears rotatively carried by said counter shaft and meshing with the gears on said sleeve and shaft.

3. In a power transmission of the type including a driving shaft, a driven shaft, a countershaft and complemental gears carried by said shafts, in combination with a second driving shaft united with said first driving shaft by a one-way clutch, a sleeve carried by said second driving shaft for limited rotative and longitudinal movement with respect thereto, spring means moving said sleeve in one direction on said shaft, cam means between said sleeve and its supporting shaft for moving said sleeve against the action of said spring, a co-acting gear rotatably carried by said sleeve, clutch means operated by the longitudinal movement of said sleeve in response to said spring for uniting said co-acting gear and sleeve, and a complemental gear carried by said countershaft and meshing with the gear on said sleeve.

4. An automatic change speed transmission comprising a driving shaft, an intermediate shaft, a driven shaft, a countershaft, a sleeve mounted for limited longitudinal movement on said intermediate shaft, spring means for moving said sleeve toward said driven shaft, cam means arranged between said sleeve and its supporting shaft for moving said sleeve in opposition to said spring, clutch means operated by the longitudinal movement of said sleeve in response to said spring for uniting said sleeve and said driven shaft, a gear rigidly carried by said sleeve, a second gear rotatably carried by said sleeve, a second clutch operated by the initial longitudinal movement of said sleeve in response to said spring for uniting said sleeve and said second gear, a pair of gears rotatably mounted on said countershaft in meshing engagement with the gears on said sleeve, one-way clutches between said pair of gears and said countershaft, a gear rotatable with the driven shaft, a complemental gear secured on said countershaft in meshing relationship with the gear on said driven shaft, a third one-way clutch uniting said driving shaft and said intermediate shaft, a second sleeve longitudinally movable on said driving shaft, a spring acting to move said second sleeve, cam means between said second sleeve and its supporting shaft for moving said sleeve in opposition to said spring, a gear rotatably supported by said second sleeve, clutch means operated by the longitudinal movement of said second sleeve in response to said spring for uniting said second sleeve with the gear supported thereby, and a pinion rigidly carried by said countershaft in meshing engagement with the gear on said second sleeve.

5. In a power transmission having a drive shaft and a counter shaft, an angularly slotted sleeve mounted on one of said shafts for limited rotative and longitudinal movement relative thereto, spring means moving said sleeve in one direction on the shaft which supports it, a pin carried by said shaft, said pin being positioned in the angular slot in said sleeve whereby relative movement between the sleeve and shaft will cause the former to move in opposition to said spring, a gear rotatable independently of said sleeve and shaft, a clutch combining said gear and sleeve for rotation together, said clutch being actuated by the movement of said sleeve in response to pressure by said spring, and a complemental gear carried by said counter shaft in meshing relationship with the first-mentioned gear.

BRUCE D. WOOLLEY.